No. 841,511. PATENTED JAN. 15, 1907.
F. A. GROSSE.
APPARATUS FOR MANUFACTURING HOLLOW GLASSWARE.
APPLICATION FILED JUNE 16, 1904.
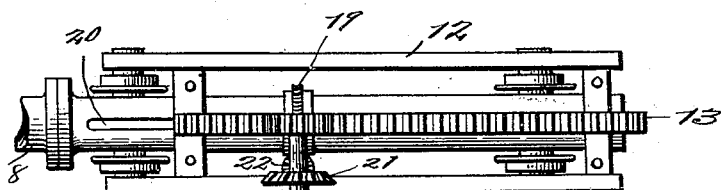
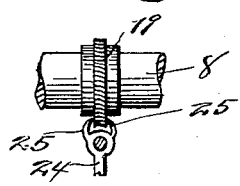
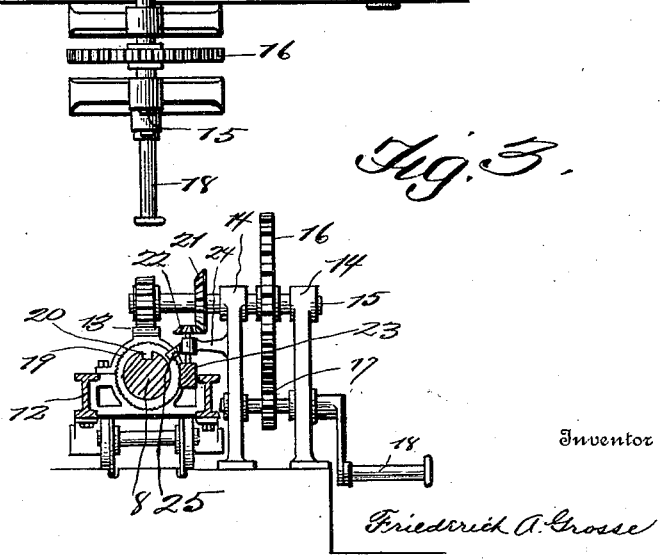
Witnesses
Inventor
Friedrich A. Grosse
By Stephen H. Brookes
Attorney

UNITED STATES PATENT OFFICE.

FRIEDRICH ARTHUR GROSSE, OF BISCHOFSWERDA, GERMANY.

APPARATUS FOR MANUFACTURING HOLLOW GLASSWARE.

No. 841,511.     Specification of Letters Patent.     Patented Jan. 15, 1907.

Application filed June 16, 1904. Serial No. 212,855.

*To all whom it may concern:*

Be it known that I, FRIEDRICH ARTHUR GROSSE, a subject of the German Emperor, and a resident of Bischofswerda, Saxony, Germany, have invented certain new and useful Improvements in Apparatus for Manufacturing Hollow Glassware; and I do hereby declare the following to be a full, clear, and exact description of the invention, such as will enable others skilled in the art to which it appertains to make and use the same.

This invention relates to certain new and useful improvements in apparatus for manufacturing hollow glassware, of which the following is a description.

This invention has particular reference to that type of molding apparatus in which a sectional mold is employed and into which is projected a hollow core, the latter during its projection or longitudinal movement having imparted thereto by suitable mechanism a rotary motion. The mold is of the sectional type.

Reference will be had to the accompanying drawings, forming a part of this specification, and in which like numerals of reference indicate corresponding parts throughout the several views, in which—

Figure 1 is a view in elevation of the mold, showing parts broken away and in section. Fig. 2 is a top plan view of the carriage for projecting and rotating the mold. Fig. 3 is an end elevation of Fig. 2; and Fig. 4 is a fragmentary view of the shaft, rotating gear therefor, and means for preventing the gear from moving with the shaft except in a rotary direction.

Reference-numeral 1 designates the lower section of the mold, and 1' the upper mold-section, the latter being capable of being swung upwardly by means of hinges 2, through all of which passes a pintle 3, provided with operating-handle 4. The mold is formed of a plurality of sections and may be of any desired length, according to the number of sections adopted. The sections of the mold are formed with peripheral tracks 5, whereby the mold is supported for partial rotation upon rollers 6 on the upper ends of standards 7.

Through the open rear end of the mold is projected the core 8, which is hollow, whereby compressed air may be supplied to the mold from pipe 9, suitably attached to the core. The glass article, which is formed between the core and mold, is thoroughly compressed by the compressed air which escapes from the core through valve-controlled port 10. This air pressing against the inner surface of the glass article insures a thorough contact throughout of the outer surface of the article and the inner surface of the mold. The flange 11 of the rear end of the mold guides the core during its entry.

The means for projecting the core consists of a carriage 12, suitably mounted on tracks and provided at its top with a longitudinal rack 13. At one side of the carriage are arranged standards 14, in the upper ends of which is journaled a shaft 15, provided with a gear 16, which is in mesh with and is operated by a gear 17 on a shaft which is operated by a crank 18, suitably operated.

For imparting a movement in a rotary direction to the core simultaneously with its projection by the carriage a worm-collar 19 is provided. This collar encircles the core and is provided with a key which operates in slot 20, formed in the core and longitudinally thereof. On the shaft 15 is provided a bevel-gear 21, meshing with a similar gear 22, which is on the upper end of a shaft provided at its lower end with a worm-gear 23, the latter being in mesh with worm gear or collar 19 to impart a rotary movement to the core. This last-mentioned shaft is mounted in a bracket extension 24 of one of the standards 14, and from this bracket project two fingers 25, embracing both sides of the worm gear or collar 19 to prevent the latter from moving in a longitudinal direction with the core as the latter is projected. The rotary movability of the core and mold enables either to be rotated separately or both together either in the same or opposite directions, thus greatly facilitating the operation, especially the removal of the core and the article being molded.

Having fully described the invention, what is claimed as new and useful, and desired to be secured by Letters Patent, is—

1. A molding apparatus comprising a mold, a core, and a carriage supporting said core and for projecting the core into the mold, and means for rotating the core during its projection.

2. A molding apparatus for hollow ware, comprising a mold rotatably supported, a core, a carriage supporting the core, means for moving the carriage longitudinally to project the core into the mold, means for rotating the core during its entry into the mold, and means for supplying compressed air through the core to the mold.

3. A molding apparatus for hollow glassware, comprising a mold formed of a plurality of sections each made up of half-sections, means for separating the half-sections, means for permitting rotation of the mold, a core, flexible means for supplying compressed air to the core, valve-controlled means for allowing the air to escape from the core into the mold, means for moving the core longitudinally into and out of the mold, and means for rotating the core during such movement.

In testimony that I claim the foregoing as my invention I have signed my name in presence of two subscribing witnesses.

FRIEDRICH ARTHUR GROSSE.

Witnesses:
   CHAS. L. COLE,
   PAUL ARRAS.